(12) United States Patent
Belogolovy

(10) Patent No.: US 9,841,784 B2
(45) Date of Patent: Dec. 12, 2017

(54) APPARATUS AND METHOD FOR CONTROLLING WEARABLE DEVICES USING WIRELESS ENERGY HARVESTING

(71) Applicant: Intel Corporation, Santa Clara, CA (US)

(72) Inventor: Andrey Belogolovy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 471 days.

(21) Appl. No.: 14/499,008

(22) Filed: Sep. 26, 2014

(65) Prior Publication Data
US 2016/0091920 A1    Mar. 31, 2016

(51) Int. Cl.
| | |
|---|---|
| G06F 1/16 | (2006.01) |
| H02J 5/00 | (2016.01) |
| H04B 5/00 | (2006.01) |
| G06F 1/26 | (2006.01) |
| H02J 13/00 | (2006.01) |
| H02J 50/10 | (2016.01) |
| H02J 50/23 | (2016.01) |

(52) U.S. Cl.
CPC .............. G06F 1/163 (2013.01); G06F 1/26 (2013.01); G06F 1/263 (2013.01); G06F 1/266 (2013.01); H02J 5/005 (2013.01); H02J 13/0075 (2013.01); H02J 50/10 (2016.02); H02J 50/23 (2016.02); H04B 5/0037 (2013.01)

(58) Field of Classification Search
CPC ..................................................... G06F 1/163

USPC ......................................................... 307/104
See application file for complete search history.

(56) References Cited

U.S. PATENT DOCUMENTS

| | | | |
|---|---|---|---|
| 7,010,332 B1 | 3/2006 | Irvin et al. | |
| 2010/0308664 A1* | 12/2010 | Face | H02J 13/0075 307/104 |
| 2013/0154826 A1 | 6/2013 | Ratajczyk | |
| 2014/0098983 A1 | 4/2014 | Clow | |
| 2014/0119582 A1 | 5/2014 | Jia et al. | |

FOREIGN PATENT DOCUMENTS

WO    2014137918 A1    9/2014

OTHER PUBLICATIONS

International Search Report and Written Opinion for International Patent Application No. PCT/US2015/044042, dated Nov. 20, 2015, 14 pages.
Roetenberg et al., "Xsens MVN: Full 6DOF Human Motion Tracking Using Miniature Inertial Sensors", XSENS Technologies—Version Apr. 3, 2013 (9 pages).

(Continued)

*Primary Examiner* — Joseph Chang
(74) *Attorney, Agent, or Firm* — Green, Howard & Mughal, LLP

(57) ABSTRACT

Described is an apparatus which comprises: an antenna to sense or receive energy from an external source; a harvesting module to harvest power according to the sensed or received energy; a decoder coupled to the harvesting module, the decoder to decode the sensed or received energy and to generate one or more commands; and one or more switches operable to turn on or off according to the one or more commands.

22 Claims, 5 Drawing Sheets

(56) References Cited

OTHER PUBLICATIONS

Belogolovy, Audrey, "Techniques for Wireless Communication Between a Terminal Computing Device and a Wearable Computing Device", U.S. Appl. No. 14/129,944, filed Dec. 28, 2013, 51 Pages.
Ishizaki et al., "A battery-less WiFi-BER modulated data transmitter with ambient radio-wave energy harvesting", Symposium on VLSI Circuits (VLSIC), Jun. 15-17, 2011, 1 Page of Abstract Only.

\* cited by examiner

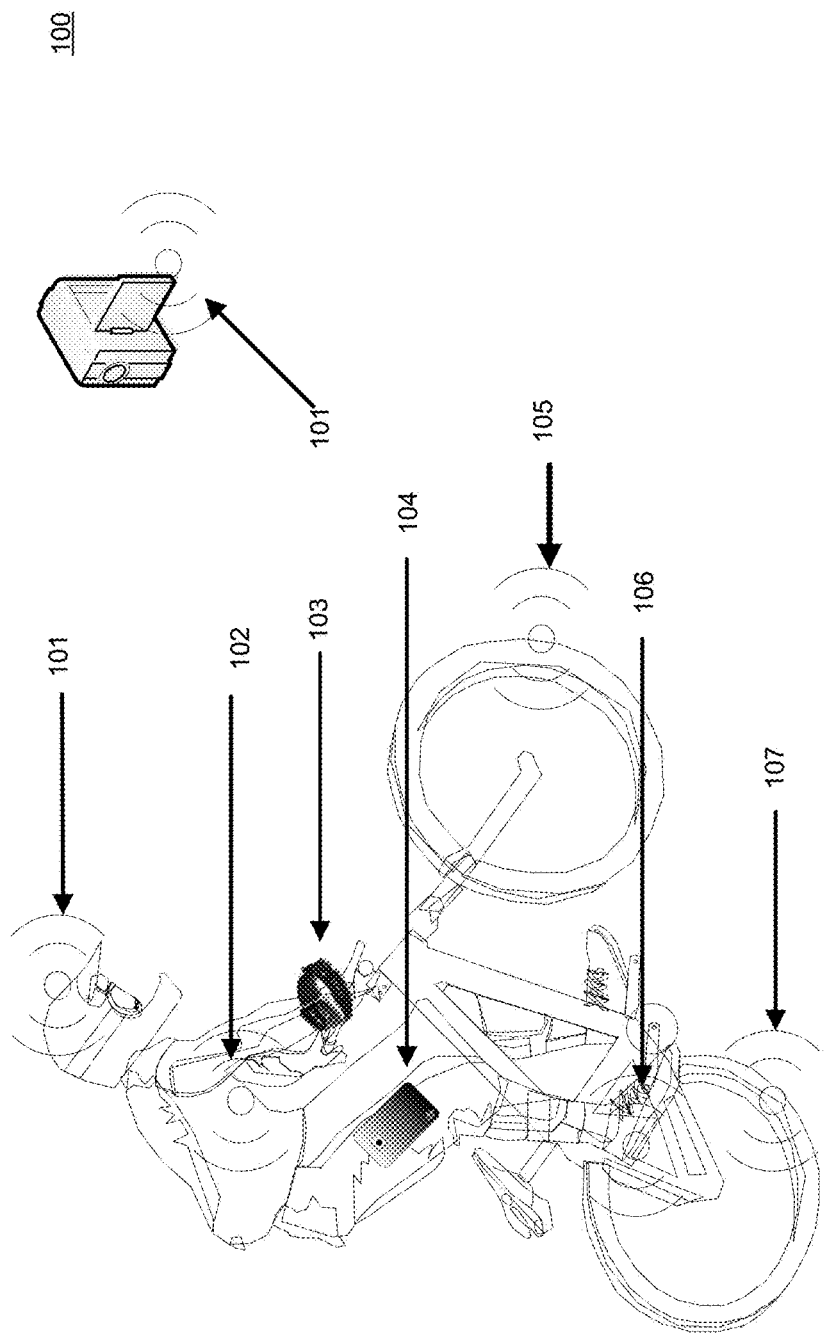

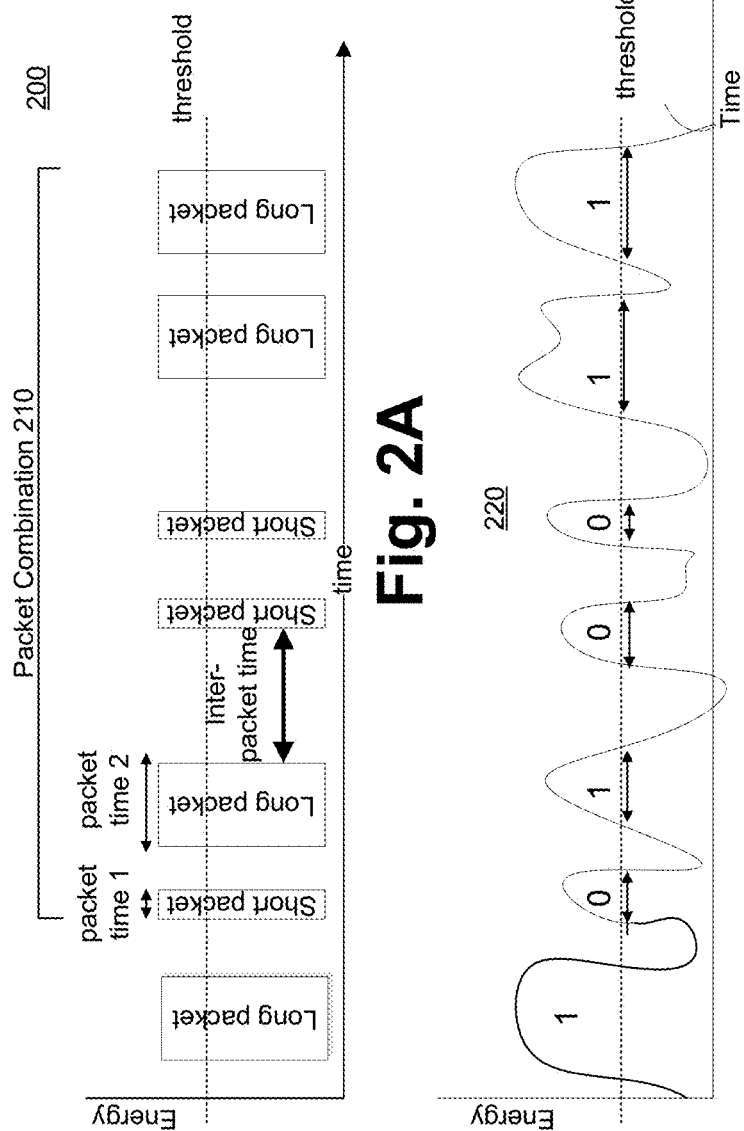

APPARATUS AND METHOD FOR CONTROLLING WEARABLE DEVICES USING WIRELESS ENERGY HARVESTING

BACKGROUND

Wearable computing devices are typically small computing devices operating on relatively small amounts of power. Wearable computing devices may gather information such as sensor information, perform processing functions and then convey information to a terminal computing device. The terminal computing device may be a larger device such as a notebook computer, a tablet computer, or a smart phone. The small size of wearable computing devices may result in use of these types of devices for monitoring or sensing biological and/or environmental conditions on, in or around a person, animal, or inanimate object. A wearable computing device may communicate with a terminal computing device using low power wireless communications.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 1 illustrates an ensemble of wearable devices controllable wirelessly by a controlling device using wireless energy harvesting, according to some embodiments of the disclosure.

FIG. 2A illustrates a modulation scheme with Wireless Local Area Network (WLAN) packets generated by the controlling device carrying identification (ID) and/or command for one or more wearable devices, according to some embodiments of the disclosure.

FIG. 2B illustrates energy received or sensed by an antenna and/or harvesting module associated with a wearable device, the energy representing the WLAN packets, according to some embodiments of the disclosure.

DETAILED DESCRIPTION

Figure 3A:
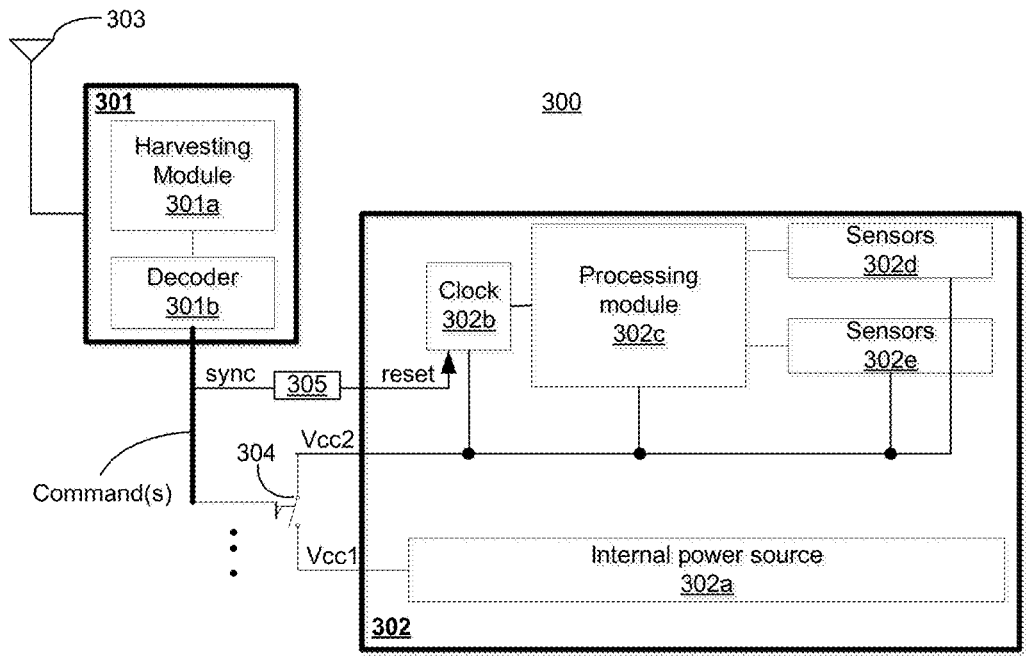
FIG. 3A illustrates an apparatus associated with a wearable device for receiving the WLAN packets as energy and for controlling one or more functions of the wearable device, according to some embodiments of the disclosure.

Some embodiments are generally directed to improvements for wireless communication between a terminal computing device and a wearable computing device. A wearable computing device may communicate via wireless communications due to a desire for flexibility in deploying these types of devices on the surface or within a person, animal, or inanimate object. As such, wearable computing devices may be small (e.g., a few millimeters in diameter) and may use low amounts of power to both gather sensor information and for wireless communication to a terminal computing device. The wireless communication may be to transmit sensor information, transmit operating status information, or to receive commands.

The term wearable device (or wearable computing device) generally refers to a device coupled to a person. For example, devices (such as sensors, cameras, microphones (mic), etc.) which are directly attached on a person or on the person's clothing, or which are near a person (e.g., devices in a car when the person is in the car, devices in walls near a person, etc.).

The small size of wearable computing devices may be problematic to the use of batteries to power operations and/or for use in wireless communication. In some examples, wearable computing devices may be powered by a specialized external source based on Near Field Communication (NFC). The specialized external source may provide an electromagnetic field that may be harvested by circuitry at the wearable computing device. A possible problem with NFC is that the proximity needed to power the wearable computing device with specialized external sources may be only a few centimeters. Also, many types of terminal computing devices lack NFC capabilities.

Another source of electromagnetic field associated with wireless communication is Wireless Local Area Network (WLAN) transmissions. WLAN transmission use far field radio communications that have a far greater range to power a wearable computing device than NFC transmission. WLAN transmissions are commonly used for wireless communications with most types of terminal computing devices.

For example, the WLAN transmissions may be used in accordance with one or more WLAN standards based on Carrier Sense Multiple Access with Collision Detection (CSMA/CD) such as those promulgated by the Institute of Electrical Engineers (IEEE). These WLAN standards may be based on CSMA/CD wireless technologies such as Wi-Fi™ and may include Ethernet wireless standards (including progenies and variants) associated with the IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11").

In some examples, Wi-Fi wireless technologies commonly in use by most terminal computing devices (e.g., smart phones, tablet PC, laptops, etc.) may provide an acceptable electromagnetic field for energy harvesting via WLAN transmissions. These WLAN transmissions may be harvested by circuitry at the wearable computing device at distances of at least one meter. In some embodiments, the amount of energy harvested at the wearable computing device can be used to control various functions of the wearable computing device without additional power consumption.

There are many types of smart devices and wearable computing devices around a person. Some of them are switched on all the time, but some may need to be switched off completely to save power. It is inconvenient to replace batteries of wearable devices when they are on a person and the person is, for example, driving, riding, or running. To save power and increase the working life of these wearable computing devices, some embodiments describe apparatus and method to turn on or off the wearable devices or sensors by a remote command. Some embodiments use WLAN transmissions (e.g., regular Wi-Fi transmissions) to wake up a remote device (e.g., a wearable computing device) with substantially zero (or completely zero) power consumption at the wearable computing device side.

In some embodiments, a WLAN electromagnetic energy-sensing block is added to a wearable platform that operates as an external power-on/off switch and as a synchronization unit. In some embodiments, any WLAN enabled device can be made a terminal-computing device to control one or more functions of the wearable platform or device. While various embodiments are described with reference to switching wearable device power on or off with a command from a terminal computing device, and with reference to synchronizing two or more wearable (or all wearable devices) on a person or near a person with a command from the terminal computing device (also referred here as a controller), other functions of the wearable computing device can be controlled by the controller.

There are many technical effects of the various embodiments. For example, wearable devices can be switched on or off with no extra power at the wearable device end. The apparatus of various embodiments allows wearable devices to be turned off when the wearable devices are not in use, and to be turned on when needed. This action saves power and extends the operating life of wearable devices. In some embodiments, no extra wireless connectively is needed on the controller side because existing WLAN transmission technology on the controller is used for sending commands to the wearable devices. The apparatus of some embodiments can be used for synchronizing wearable devices on or near a person.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal or data/clock signal. The meaning of "a," "an," and "the" include plural references. The meaning of "in" includes "in" and "on."

The terms "substantially," "close," "approximately," "near," and "about," generally refer to being within +/−20% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors in various circuits, modules, and logic blocks are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure.

FIG. 1 illustrates an ensemble 100 of wearable devices controllable wirelessly by a controlling device using wireless energy harvesting, according to some embodiments of the disclosure. In this example, ensemble 100 is on a person and his ride (here, a bicycle). However, the embodiments are not limited to such. Other scenarios of wearable devices and their usage may be work with various embodiments.

For example, sensors can be embedded into some other products (e.g., walls in a house, shoes, clothes, bike tires, etc.) and can be controlled using a controller. While examples described here discuss controlling to refer to turning on/off a wearable device or synchronizing wearable devices, other types of controlling functions can be realized. In another example, when a person may be doing an activity that makes it impossible or impractical to push a button or switch something (e.g., when the person is riding a bike and needs to steer, or is running and is carrying a bag, etc.), controller (e.g., a smart device) can be controlled by voice command to control one or more functions of the variable devices. In another example, a person may want to switch different wearable devices on or off by a voice command. In some embodiments, a smart device (e.g., controller) that has voice recognition capability interprets a device name from the voice and sends an electromagnetic command to one or more wearable devices to control them (e.g., to switch them on).

Wearable synchronization can be used in the following cases. In one example, synchronization using various embodiments may be used for activity detection and tracking. In the case of a virtual fitness/sports coach, multiple sensors need to be in sync to simultaneously capture all events. The data from synchronized wearable devices can be used to build a report showing the user his/her correct/incorrect motions and recommendations on how to improve activity (e.g., recommendations to jump later, to raise right hand faster, etc.). Wearable synchronization can be used to capture motion for animation and gaming. Wearable synchronization can also be used for group activity recognition (e.g., dancing, fitness, etc.)

In another example, wearable synchronization described with reference to various embodiments can be used for improving multimedia experience. For example, an additional microphone can be added for noise reduction, remote switch, multimedia stitching, etc. Having synchronization between, for example, two cameras, allows a user or logic to capture stereo. Having audio sensor synchronization also allows a user or logic to capture stereo with separated sensors. Audio sensor synchronization also allows a user or logic to measure distances or direction to the audio source by measuring time delays. In another example, wearable synchronization described with reference to various embodiments can be used for improving speech recognition by getting audio from multiple locations time-to-time. There are several multi-microphone noise reduction techniques that require precise microphone-to-microphone synchronization (i.e., they assume that the microphones are on the same board operating with the same clock).

In another example, wearable synchronization described with reference to various embodiments can be used for localizing a speaker and for live logging. For example, having multiple microphones operating in sync, a system can determine its microphone location geometry. It can then locate the audio/voice source by signal time of arrival difference. With known audio source location, the system can define regions of interest in the image/video, automatically highlight the audio source location in the video frame, match recorded audio with the speaking person (face or even name if face recognition presents), etc. In another example, wearable synchronization described with reference to various embodiments can be used for generating panoramic image/video from multiple cameras.

Camera arrays are used to get new experiences with video capturing. Panoramic video capturing with a single camera is problematic because of optical distortions in the case of wide angle lens. Synchronization according to various embodiments can be used to synchronize multiple cameras. In such an example, every camera (e.g., one on a smart glass, one on a smart phone, one on a helmet) can capture its own part of the scene, and the whole scene can be stitched later.

Continuing with the example of FIG. 1, ensemble 100 of wearable devices includes device 101 (e.g., camera and/or microphone) on a helmet, device 102 (e.g., blood pressure sensor, pulse sensor, and/or microphone, etc.) on the person's arm, device 103 (e.g., a smart watch that can function as a terminal controller or a device to be controlled), device 104 (e.g., a smart phone and/or tablet in a pocket of the person's clothing), device 105 (e.g., pressure sensor to sense or measure pressure of a tire), device 106 (e.g., an accelerometer to measure paddling speed), device 107 (e.g., another pressure sensor for the other tire). In some embodiments, ensemble 100 of wearable devices has the capability to communicate by wireless energy harvesting mechanisms or other types of wireless transmission mechanisms.

Traditionally remote commands or time synchronization are implemented via data connection that is already established. In such cases, data connection power consumption is excessive as far as wearable devices are concerned especially when no command is being sent to the wearable devices. For example, Bluetooth® low energy sleep or idle state current ranges from 0.4 µA to 235 µA (on average 270 µA, which is high for such devices). Also for time synchronization, additionally NTP-like protocols (that use iterative averaging) may burn even more power.

But in the case of wearable devices it can be assumed that all the devices are near each other. Also, typically a person who has that wearable sensor ensemble also has a controller (e.g., smart phone or some other more complicated and powerful device), which can be used to control wearable devices or to gather data from them. Here, time synchronization for sensors may refer to relative time/clock synchronization, and not absolute time synchronization. For these cases, controller 104 and the associated wearable devices/sensors use a simple synchronization based on generation of the specific WLAN packets (e.g., Wi-Fi packets) transmitted by controller 104 (e.g., smart phone) and harvested at the wearable side without having an always-on data connection between the controller and wearable devices that burns power even when not in use.

In some embodiments, the user riding the bike can touch a button on device 104 (also referred here as controller 104) or use another gesture (e.g., voice command, hand motion, etc.) to cause controller 104 to send a command to one or more wearable devices to perform one or more functions (e.g., turn on/off, synchronize, report, etc.) without extra power consumption at the wearable device side. In some embodiments, the user can send commands to specific wearable devices by providing identification (ID) of such wearable devices in the command. For example, the user may send a command via controller 104 to device 101 to turn off the camera on device 101 without impacting the functions of other wearable devices. In some embodiments, controller 104 is operable to send a unified command to all wearable devices on or near the person. For example, controller 104 may command all wearable devices to synchronize with one another before the user begins riding the bike.

In some embodiments, each wearable device includes a sensing block that operates as an external power-on switch and as a synchronizer. In some embodiments, the sensing block is controllable by controller 104 to switch on or off power to one or more wearable devices with a command from controller 104. In some embodiments, sensing block is controllable by controller 104 to synchronize all wearable devices on or near the person with a command from controller 104 without having an always-on data connection between controller 104 and the wearable devices.

FIG. 2A illustrates a modulation scheme 200 with WLAN packets generated by a controlling device (e.g., controller 104) carrying ID and/or command for one or more wearable devices, according to some embodiments of the disclosure. It is pointed out that those elements of FIG. 2A having the same reference numbers (or names) as the elements of any other figure can operate or function in any manner similar to that described, but are not limited to such. Here, x-axis is time and y-axis is energy.

In some embodiments, modulation scheme 200 includes packets of various packet sizes each having charge duration of a given time (e.g., packet time 1, packet time 2). In some embodiments, WLAN transmissions are used to transmit the packets which are harvested by a wearable computing device. For example, three different packet sizes—longest packet, short packet and long packet—having respective charge times are used to provide identification(s) and command(s) to one or more wearable devices. According to some embodiments, the charge duration time may not start until detected energy for a given WLAN transmission to transmit a packet reaches a harvest threshold at the wearable computing device. An example of harvest threshold is shown by the dashed-line in the figure.

According to some embodiments, the longest packet (here, the first packet) may be used in one or more messages by a terminal computing device to indicate to a wearable computing device that either a command is forthcoming or to transmit data/response to a previous request. Meanwhile, in some embodiments, combinations of short and long packets having times of packet time 1 and packet time 2 may be used in identification messages by the terminal computing device to indicate which wearable computing device is to respond to the command message and/or a transmit message. In some embodiments, combinations of short and long packets having times—packet time 1 and packet time 2—may also be used in command messages to the identified wearable computing device to indicate a command.

In some embodiments, the use of combinations of short and long packets may include assigning a bit value of either a '1' or '0' to each short or long packet. For example, a bit value of '0' may be assigned to a short packet having packet time 1 and a bit value of '1' may be assigned to a long packet having packet time 2.

According to some examples, the longest packet may be the longest packet size allowed by one or more IEEE 802.11 standards or other types of CSMA/CD standards being used for the WLAN transmission to transmit packets. For example, some IEEE 802.11 standards allow for a maximum or longest packet size of 2132 bytes. Also, the short packet (e.g., having packet time 1) may represent a packet that includes just a preamble and a header and may represent the smallest packet used for WLAN transmissions to transmit packets. Long packet (e.g., having packet time 2) may represent a packet that is substantially larger than the short packet but also substantially smaller than the longest packet size. For example, the long packet may have a packet size of 500 bytes. Examples are not limited to the above-mentioned packet sizes provided for the longest, long and short packets. Also, longest packet sizes may be dictated by other standards than IEEE 802.11 for WLAN transmissions.

In some embodiments, a terminal computing device (e.g., controller 104), which is operable to implement a modulation scheme similar to modulation scheme 200, may include a Media Access Controller (MAC) as part of a wireless network controller that may operate in accordance with Wi-Fi wireless technologies such as IEEE 802.11 standards. For these examples, use of variable packet sizes to transmit messages to a wearable computing device requires little to no modification to modulation coding schemes used by a Wi-Fi MAC operating in compliance with IEEE 802.11 standards. In order to implement the modulation scheme that is similar to modulation scheme 200, logic and/or features of the terminal computing device may be capable of causing a plurality of distinct packet sizes or lengths that may be formatted by the MAC in accordance with IEEE 802.11 standards and then transmitted using WLAN transmissions.

FIG. 2B illustrates energy 220 received or sensed by an antenna and/or harvesting module associated with a wearable device, the energy representing the WLAN packets, according to some embodiments of the disclosure. It is pointed out that those elements of FIG. 2B having the same reference numbers (or names) as the elements of any other figure can operate or function in any manner similar to that described, but are not limited to such. FIG. 2B is described with reference to FIG. 2A. Here, x-axis is time and y-axis is energy.

Continuing with the modulation scheme 200 described with reference to FIG. 2A, the assigned bit values to the received energy of packet combination 210 may indicate a 6-bit value of 010011. The 6-bit value, for example, may be an identifier to indicate a given wearable computing device via which a terminal computing device may be targeting for a communication. Logic and/or features at a terminal computing device may be capable of using packet combinations having two or more packet sizes to generate any number of bits to encode or decode messages generated in a manner similar to modulation scheme 200. Also, logic and/or features at a wearable computing device may be capable of decoding these message.

FIG. 3A illustrates apparatus 300 associated with a wearable device for receiving the WLAN packets as energy (e.g., as shown with reference to FIGS. 2A-B) and controlling one or more functions of the wearable device, according to some embodiments of the disclosure. It is pointed out that those elements of FIG. 3A having the same reference numbers (or names) as the elements of any other figure can operate or function in any manner similar to that described, but are not limited to such. In some embodiments, apparatus 300 comprises module 301, main portion 302 of wearable device, antenna 303, and one or more switches 304 and 305. In some embodiments, module 301 comprises Harvesting Module 301a and Decoder 301b.

In some embodiments, Harvesting Module 301a does not use power from a battery source but harvests power from energy received via antenna 303. Energy harvesting can be achieved using a diode connected to the antenna and a capacitor (or a set of capacitors) connected to the diode. Multiple cascades (i.e., diode and capacitor combinations) increase the efficiency of power harvesting. In some embodiments, Harvesting Module 301a senses/receives energy in a given WLAN band. In some embodiments, according to duration of the energy presence times of received energy, Harvesting Module 301a builds a binary sequence and also harvests some power to feed Decoder 301b. For example, harvested power may be 30.8 µW at a 30 cm distance from a 250 mW (24 dB) WLAN emission.

Figure 3B:
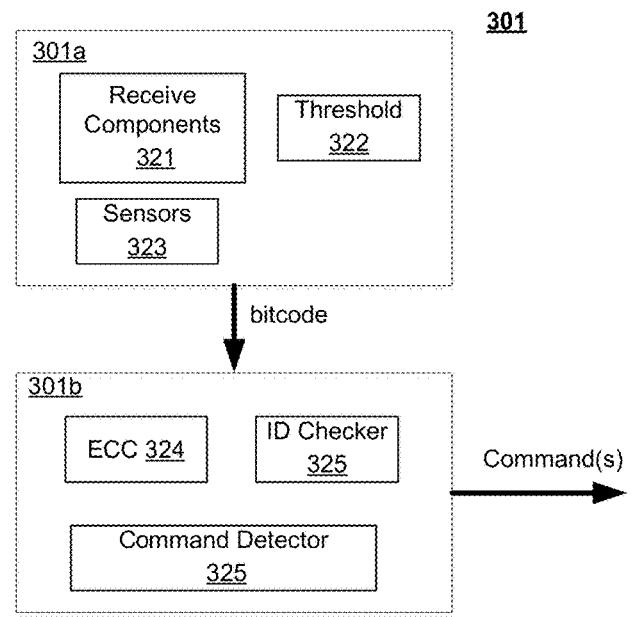
FIG. 3B illustrates various components of a module to harvest and decode WLAN packets, according to some embodiments of the disclosure.

FIG. 3B illustrates various components of module 301 to harvest power and decode WLAN packets, according to some embodiments of the disclosure. It is pointed out that those elements of FIG. 3B having the same reference numbers (or names) as the elements of any other figure can operate or function in any manner similar to that described, but are not limited to such In some embodiments, Harvesting Module 301a includes Receive Components 321, Sensors 323 (sensing blocks), and Threshold 322. In some embodiments, Receive Components 321 receives energy sensed by Antenna 303. In some embodiments, Receive Components 321 comprises a number of diode and capacitor combination cascades. In some embodiments, Sensors 323 are used to analyze the received energy function shape, to detect maximum peaks in the energy function shape, and to compare the energy function peak durations with Threshold 322 (which may be a predetermined or programmable threshold) to generate a binary code (bitcode). Sensors 323 can be a pressure sensor, a temperature sensor, a microphone, a camera, an air quality sensor (CO-sensor), etc. In some embodiments, Threshold 322 is stored in a nonvolatile memory (NVM).

Examples of NVMs are phase change memory (PCM), a three dimensional cross point memory, a resistive memory, nanowire memory, ferro-electric transistor random access memory (FeTRAM), flash memory such as NAND or NOR, magnetoresistive random access memory (MRAM) memory that incorporates memristor technology, spin transfer torque (STT)-MRAM, etc. In other embodiments, LUT 200 is implemented in other types of storing circuits.

Referring back to FIG. 3A, in some embodiments, Decoder 301b decodes the binary sequence (i.e., bitcode) generated by Harvesting Module 301a to determine Command(s) for one or more switches 304 and 305. In some embodiments, the Command(s) include a power on/off command for switch 304. In some embodiments, Command(s)

include a synchronization (sync) command for switch 305 to reset internal clock source of main portion 302 of wearable device.

Referring back to FIG. 3B, in some embodiments, Decoder 301*b* includes Error Correction Code (ECC) 324, ID Checker 325, and Command Detector 325. Decoder 301*b* performs error correction to match the resulting bitcode from Harvesting Module 301*a* with a device ID. Examples of error correction include Forward Error Correction (FEC), Low Density Parity Check (LDPC), Cyclic Redundancy Check (CRC), etc. Hardware of Decoder 301*b* may be implemented by synthesizing Register Transfer Language (RTL) code that describes the decoding function. In some embodiments, after Decoder 301*b* determines that the code generated by Harvesting module 301*a* matches a command code, Decoder 301*b* sends a command to one or more switches (or directly to main portion 302).

In some embodiments, each wearable device has a unique ID. For example, an ID encoded as 64 bits unique number plus 32 bits CRC to minimize the fault match probability to $2^{-32}$, where the resulting ID of length 96 bits is hard encoded. In some embodiments, the ID is hardcoded into an ID detector (not shown) which is part of the Harvesting Module 301*a*. In some embodiments, the ID detector operates as a binary matcher (e.g., of length 96 bits) of the stored bit sequence extracted from the received energy. In some embodiments, as new bits arrive, the ID detector shifts its sequence and performs a new 96 bit matching. If a match is found, the ID detector sends a command to the main portion 302 of wearable device via one or more switches. Commands can be one or more of: command to turn the wearable power on, command to reset clock, command to turn on a specific sensor (e.g., Sensor N), command to turn high-rate data connection on, etc.

In some embodiments, the command codes are hard encoded into a NVM of Command Detector 325. Assuming the synchronization code is the same for all the devices, to send a synchronization (sync) command to a given group of wearable devices, a protocol can be used to group or pair the wearable devices that a user needs to operate as a single group.

In some embodiments, the protocol can be one in which a master device (e.g., controller 104) sends IDs of the wearable devices one-by-one that it wants to synchronize. A wearable device that receives its ID then enters a ready state (i.e., it may interpret the first sync command as a command to reset its clock). Another example of a protocol is one in which a master device (e.g., controller 104) sends a sync command which is received by all wearable devices. The wearable devices then reset their clocks. In some embodiments, in the case of power on switching when the wearable devices receive their respective IDs, the wearable devices switch on the power-on/off switch (e.g., 304) to complete the protocol.

Referring back to FIG. 3A, in some embodiments, main portion 302 is an existing wearable device and apparatus 302, 303, 304, and 305 are added to it to control the main portion 302 of the wearable device (i.e., to reset it, sync it, turn on/off power to it, etc.). In some embodiments, switches 304 are implemented as transistors that can turn on or off at very low voltages (e.g., less than 1V). In some embodiments, device 302 comprises an Internal power source 302*a*, Clock source 302*b*, Processing module 302*c*, Sensors 302*d* and 302*e*. In some embodiments, Internal power source 302*a* generates power Vcc1 which can be provided to other units of device 302 according to operation of switch 304.

In some embodiments, Internal power source 302*a* is a battery-powered source. In some embodiments, to save power to main portion 302 of wearable device, Internal power source 302*a* may need to be turned off completely. Assuming main portion 302 of the wearable device is turned off, a user of the wearable device may not have access to the wearable device to turn it on when the user is busy (e.g., when riding a bike). In such cases, the user (via controller 104) sends a command to apparatus 300 to turn on main portion 302 of the wearable device.

In some embodiments, power-on/off switch 304 couples Vcc1 and to Vcc2 according to the command received to power on main portion 302 of the wearable device. In some embodiments, when main portions 302 of all wearable devices (or a group of wearable devices) on or near a person are powered on, the wearable devices are synchronized. In some embodiments, a separate sync command is provided to switch 305 of all wearable devices (or a group of wearable devices) on or near a person to cause Clock source 302*b* to reset which causes Processing module 302*c* to begin processing from a predetermined state (i.e., clock edges of all wearable devices are aligned in time).

Switching latency of various embodiments is short and can be adjusted according to durations of WLAN packets. For Wi-Fi a/g, the minimum PHY frame duration is 24 μs (i.e., for 1 bit payload data). Assuming that the shortest packets are used to transmit a bit value of '0' and twice as long packets are used to transmit a bit value of '1', there may be approximately 100 μS to 200 μS per useful bits. This means, to send 100 bits ID, approximately 10 mS to 20 mS can be used as a latency estimate.

Synchronization latency of various embodiments is also short and can be adjusted according to propagation delays of Harvesting module 301*a* and Decoder 301*b*. Latency may not only be short, but it may also be very close to constant. Assuming that Decoder 301*b* takes approximately the same time to propagate data and to generate Command(s) as the propagation delay of Harvesting module 301*a* (i.e., the CRC calculation and command comparison times are the same across all the wearable devices), the synchronization error can be determined by the response time of the harvesting modules that can be assumed to be no longer than the duration of '1' (i.e., long packet). So, the wearable device synchronization error may be in the order of 50 μs.

In some embodiments, Antenna 303 is tuned to receive the WLAN band from controller 104. Antenna 303 may be a single antenna or antenna arrays. In some embodiments, Antenna 303 is implemented as a single wire coil. In some embodiments, Antenna 303 is implemented as a microwave meta-material with integrated power harvesting functionality.

Figure 4:
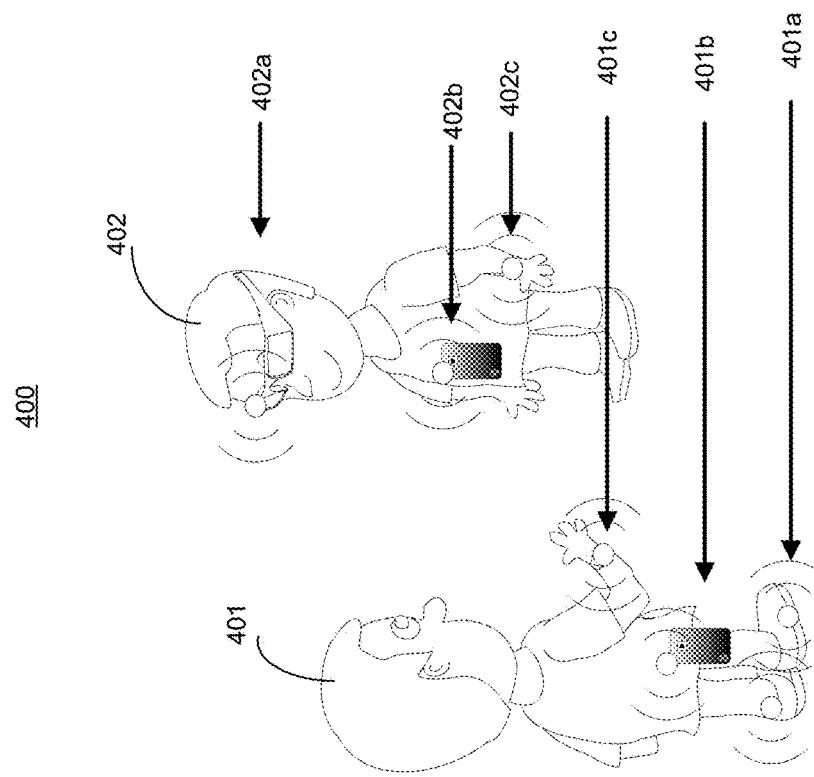
FIG. 4 illustrates a usage model in which wearable devices associated with multiple people are paired and controlled by one or more controlling devices using wireless energy harvesting, according to some embodiments of the disclosure.

FIG. 4 illustrates a usage model 400 in which wearable devices associated with multiple people are paired and controlled by one or more controlling devices using wireless energy harvesting, according to some embodiments of the disclosure. It is pointed out that those elements of FIG. 4 having the same reference numbers (or names) as the elements of any other figure can operate or function in any manner similar to that described, but are not limited to such.

Wearable devices can introduce usage models in which one person has/uses multiple devices simultaneously, and all wearable devices may cooperate with each other. The cooperation is not limited to wearable devices that belong to one person but can be extended to friends, colleagues, family members who may pair their wearable devices to cooperate and get more benefits. One such usage model is shown in model 400. Here, two persons 401 and 402 have some or all of their wearable devices paired so they can share data with one another. In some embodiments, controller held by or on one person can control wearable devices on that person as well as paired wearable devices on another person using wireless energy harvesting.

In usage model 400, person 401 has multiple wearable devices including 401a (e.g., pedometer), 401b (e.g., controller such as a smart phone), and 401c (e.g., smart watch). Person 402 also has multiple wearable devices including 402a (e.g., smart glass), 402b (e.g., controller such as a smart phone), and 401c (e.g., smart watch). Once one or more wearable devices on persons 401 and 402 are paired, in some embodiments, controllers 401a or 402a can be used to power on/off one or more wearable devices on persons 401 and 402 using wireless harvesting as described with reference to FIGS. 1-3. Referring back to FIG. 4, in some embodiments, controller 401a or 401b can be used to synchronize all wearable devices on persons 401 and 402 using wireless harvesting as described with reference to FIGS. 1-3.

Figure 5:
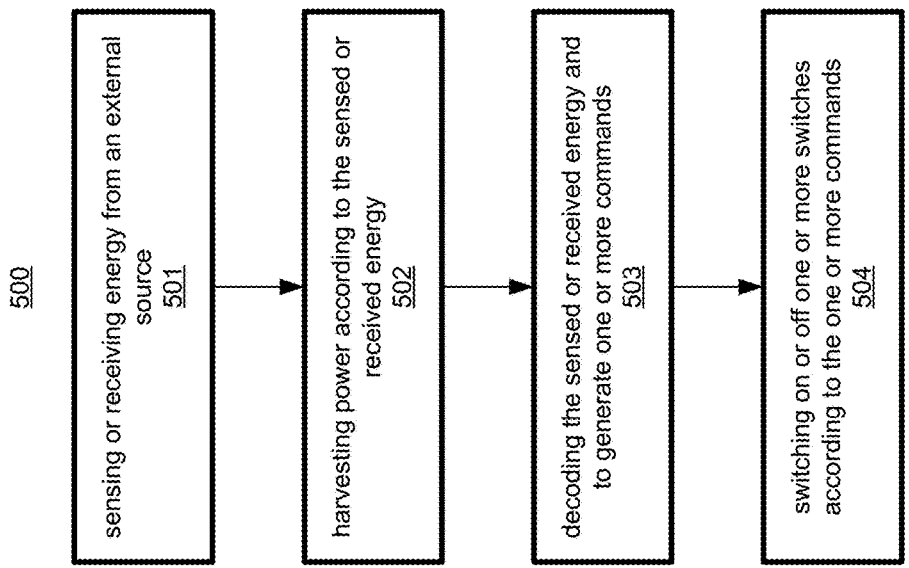
FIG. 5 is a flowchart of a method performed by a wearable device upon instructions from a controlling device, according to some embodiments of the disclosure.

FIG. 5 is a flowchart 500 of a method performed by a wearable device upon instructions from a controlling device, according to some embodiments of the disclosure. It is pointed out that those elements of FIG. 5 having the same reference numbers (or names) as the elements of any other figure can operate or function in any manner similar to that described, but are not limited to such.

Although the blocks in flowchart 500 with reference to FIG. 5 are shown in a particular order, the order of the actions can be modified. Thus, the illustrated embodiments can be performed in a different order, and some actions/blocks may be performed in parallel. Some of the blocks and/or operations listed in FIG. 5 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 501, Antenna 303 senses or receives energy (e.g., energy packets 220 received in a given WLAN band) from an external source (e.g., controller 104). At block 502, Harvesting Module 301a harvests power according to the sensed or received energy. In some embodiments, during operation, Harvesting Module 301a stores received electric energy in its capacitors, and then that stored energy feeds the processing scheme (i.e., Decoder 301b, threshold decision maker, CRC, etc.) like a battery. Having a simple processing scheme may be desirable, so the harvested power is enough to feed it. In some embodiments, based on duration of the energy presence times, Harvesting Module 301a generates a binary sequence (i.e., bitcode) as described with reference to FIGS. 2-3.

Referring back to FIG. 5, at block 503, Decoder 301b decodes the bitcode (generated by the sensed or received energy) to determine ID of the wearable device, authenticity of the command, and what the command is. The command can be a single command or multiple commands. Examples of commands include: a command to turn on the apparatus; a command to reset clock; a command to turn on a sensor; a command to turn on a high-rate data connection; or a command to synchronize two or more wearable devices. At block 504, Decoder 301b causes switch 304 to turn on/off (assuming the command is the power on/off command) to provide or disconnect power to the wearable device. Other commands can perform other functions on the wearable devices, according to various embodiments.

Figure 6:
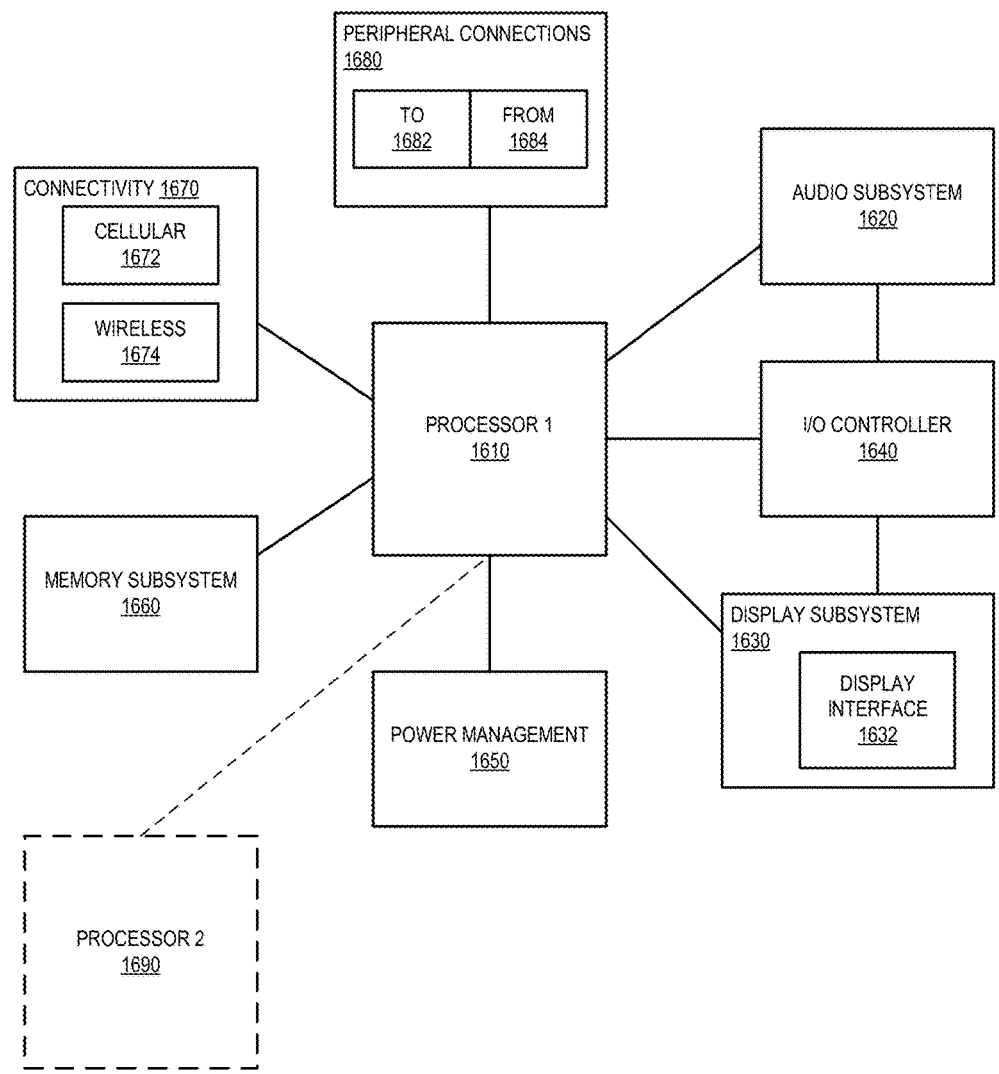
FIG. 6 illustrates a smart device or a computer system or a SoC (System-on-Chip) with apparatus for controlling one or more wearable devices using wireless energy harvesting, according to some embodiments.

FIG. 6 illustrates a smart device or a computer system or a SoC (System-on-Chip) with apparatus for controlling one or more wearable devices using wireless energy harvesting, according to some embodiments. It is pointed out that those elements of FIG. 6 having the same reference numbers (or names) as the elements of any other figure can operate or function in any manner similar to that described, but are not limited to such.

FIG. 6 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 1610 with apparatus for controlling one or more wearable devices using wireless energy harvesting, according to some embodiments discussed. Other blocks of the computing device 1600 may also include the apparatus for controlling one or more wearable devices using wireless energy harvesting, according to some embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, in some embodiments an apparatus is provided which comprises: an antenna to sense or receive energy from an external source; a harvesting module to harvest power according to the sensed or received energy; a decoder coupled to the harvesting module, the decoder to decode the sensed or received energy and to generate one or more commands; and one or more switches operable to turn on or off according to the one or more commands. In some embodiments, at least one of the one or more switches is a power switch which is operable to connect or disconnect power to at least a portion of the apparatus according to one of the one or more commands. In some embodiments, at least one of the one or more switches is a reset switch which is operable to synchronize a clock edge with a clock edge of another device according to one of the one or more commands. In some embodiments, the antenna senses or receives energy which is WLAN based energy. In some embodiments, the harvesting module analyzes function shape of the receive energy to generate a binary code.

In some embodiments, the decoder decodes the binary code to determine the one or more commands. In some embodiments, the decoder applies error correction on the binary code to determine the one or more commands. In some embodiments, the apparatus comprises logic to compare an identification code with at least a portion of the binary code. In some embodiments, the one or more commands include at least one of: a command to turn on the apparatus; a command to reset clock; a command to turn on a sensor; or a command to turn on a high-rate data connection. In some embodiments, the external source is one of: a smart phone; a tablet PC; or a WLAN enabled device. In some embodiments, the harvesting module to convert received energy into power and to supply the power to the decoder.

In another example, an apparatus is provided which comprises: logic to generate WLAN packets of different lengths, the WLAN packets indicating one or more commands; and an antenna to send the WLAN packets of different lengths to one or more wearable devices, wherein at least one of the one or more wearable devices includes one or more switches operable to turn on or off according to the one or more commands. In some embodiments, the one or more commands include at least one of: a command to turn on the apparatus; a command to reset clock; a command to turn on a sensor; a command to turn on a high-rate data connection; or a command to synchronize two or more wearable devices.

In some embodiments, at least one of the wearable devices includes an antenna to sense or receive energy from the apparatus. In some embodiments, the at least one of the wearable devices includes a harvesting module to harvest power according to the sensed or received energy. In some embodiments, the at least one of the wearable devices includes a decoder coupled to the harvesting module, the decoder to decode the sensed or received energy and to generate the one or more commands. In some embodiments, the one or more wearable devices includes at least one of sensor, camera, and microphone.

In another example, a method is provided which comprises: sensing or receiving energy from an external source; harvesting power according to the sensed or received energy; decoding the sensed or received energy and generating one or more commands; and switching on or off one or more switches according to the one or more commands. In some embodiments, the method comprises: providing the harvested power to enable decoding of the sensed or received energy. In some embodiments, at least one of the one or more switches is a power switch which is operable to connect or disconnect power to at least a portion of an apparatus according to one of the one or more commands.

In some embodiments, at least one of the one or more switches is a reset switch which is operable to synchronize a clock edge with a clock edge of two or more devices according to one of the one or more commands. In some embodiments, the external source is one of: a smart phone; a tablet PC; or a WLAN enabled device.

In another example, an apparatus is provided which comprises: means for sensing or receiving energy from an external source; means for harvesting power according to the sensed or received energy; means for decoding the sensed or received energy and to generate one or more commands; and means for switching on or off one or more switches according to the one or more commands. In some embodiments, the apparatus comprises means for providing the harvested power to enable decoding of the sensed or received energy. In some embodiments, at least one of the one or more switches is a power switch which is operable to connect or disconnect power to at least a portion of an apparatus according to one of the one or more commands.

In some embodiments, at least one of the one or more switches is a reset switch which is operable to synchronize a clock edge with a clock edge of two or more devices according to one of the one or more commands. In some embodiments, the external source is one of: a smart phone; a tablet PC; or a WLAN enabled device.

In another example, a method is provided which comprises: sending energy to one or more wearable devices, wherein the one or more wearable devices to harvest power according to the sensed or received energy, to decode the sensed or received energy, and to generate one or more commands; and causing one or more switches of the one or more wearable devices to turn on or off according to the one or more commands. In some embodiments, at least one of the one or more switches is a power switch which is operable to connect or disconnect power to at least a portion of an apparatus according to one of the one or more commands. In some embodiments, at least one of the one or more switches is a reset switch which is operable to synchronize a clock edge with a clock edge of two or more devices according to one of the one or more commands.

In another example, an apparatus is provided which comprises: means for sending energy to one or more wearable devices, wherein the one or more wearable devices to harvest power according to the sensed or received energy, to decode the sensed or received energy, and to generate one or more commands; and means for causing one or more switches of the one or more wearable devices to turn on or off according to the one or more commands. In some embodiments, at least one of the one or more switches is a power switch which is operable to connect or disconnect power to at least a portion of an apparatus according to one of the one or more commands.

In some embodiments, at least one of the one or more switches is a reset switch which is operable to synchronize a clock edge with a clock edge of two or more devices according to one of the one or more commands. In some embodiments, the one or more commands include at least one of: a command to turn on the apparatus; a command to reset clock; a command to turn on a sensor; or a command to turn on a high-rate data connection.

In another example, an apparatus is provided which comprises: means for generating WLAN packets of different lengths, the WLAN packets indicating one or more commands; and means for transmitting the WLAN packets of different lengths to one or more wearable devices, wherein at least one of the one or more wearable devices includes one or more switches operable to turn on or off according to the one or more commands. In some embodiments, the one or more commands include at least one of: a command to turn on the apparatus; a command to reset clock; a command to turn on a sensor; a command to turn on a high-rate data connection; or a command to synchronize two or more wearable devices.

In some embodiments, at least one of the wearable devices includes means for sensing or receiving energy from the apparatus. In some embodiments, the at least one of the wearable devices includes means for harvesting power according to the sensed or received energy. In some embodiments, the at least one of the wearable devices includes means for decoding the sensed or received energy and means for generating the one or more commands.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   an antenna to sense or receive energy from an external source;
   a harvesting module to harvest power according to the sensed or received energy;
   a decoder coupled to the harvesting module, the decoder to decode the sensed or received energy and to generate one or more commands; and
   one or more switches operable to turn on or off according to the one or more commands.

2. The apparatus of claim 1, wherein at least one of the one or more switches is a power switch which is operable to connect or disconnect power to at least a portion of the apparatus according to one of the one or more commands.

3. The apparatus of claim 1, wherein at least one of the one or more switches is a reset switch which is operable to synchronize a clock edge with a clock edge of another device according to one of the one or more commands.

4. The apparatus of claim 1, wherein the antenna is to sense or receive energy which is WLAN based energy.

5. The apparatus of claim 1, wherein the harvesting module is to analyze function shape of the receive energy to generate a binary code.

6. The apparatus of claim 5, wherein the decoder is to decode the binary code to determine the one or more commands.

7. The apparatus of claim 5, wherein the decoder is to apply error correction on the binary code to determine the one or more commands.

8. The apparatus of claim 5 comprises logic to compare an identification code with at least a portion of the binary code.

9. The apparatus of claim 6, wherein the one or more commands include at least one of:
   a command which is to turn on the apparatus;
   a command which is to reset clock;
   a command which is to turn on a sensor; or
   a command which is to turn on a high-rate data connection.

10. The apparatus of claim 1, wherein the external source is one of:
    a smart phone;
    a tablet PC; or
    a WLAN enabled device.

11. The apparatus of claim 1, wherein the harvesting module is to convert received energy into power and to supply the power to the decoder.

12. An apparatus comprising:
    logic to generate WLAN packets of different lengths, the WLAN packets indicating one or more commands; and
    an antenna to send the WLAN packets of different lengths to one or more wearable devices, wherein at least one of the one or more wearable devices includes one or more switches operable to turn on or off according to the one or more commands.

13. The apparatus of claim 12, wherein the one or more commands include at least one of:
    a command which is to turn on the apparatus;
    a command which is to reset clock;
    a command which is to turn on a sensor;
    a command which is to turn on a high-rate data connection; or
    a command which is to synchronize two or more wearable devices.

14. The apparatus of claim 12, wherein at least one of the wearable devices includes an antenna to sense or receive energy from the apparatus.

15. The apparatus of claim 14, wherein the at least one of the wearable devices includes a harvesting module to harvest power according to the sensed or received energy.

16. The apparatus of claim 15, wherein the at least one of the wearable devices includes a decoder coupled to the harvesting module, wherein the decoder is to decode the sensed or received energy and is to generate the one or more commands.

17. The apparatus of claim 12, wherein the one or more wearable devices includes at least one of sensor, camera, and microphone.

18. A method comprising:
    sensing or receiving energy from an external source;
    harvesting power according to the sensed or received energy;
    decoding the sensed or received energy and generating one or more commands; and switching on or off one or more switches according to the one or more commands.

19. The method of claim 18 comprising: providing the harvested power to enable decoding of the sensed or received energy.

20. The method of claim 18, wherein at least one of the one or more switches is a power switch which is operable to connect or disconnect power to at least a portion of an apparatus according to one of the one or more commands.

21. The method of claim 18, wherein at least one of the one or more switches is a reset switch which is operable to synchronize a clock edge with a clock edge of two or more devices according to one of the one or more commands.

22. The method of claim 18, wherein the external source is one of:
   a smart phone;
   a tablet PC; or
   a WLAN enabled device.

\* \* \* \* \*